United States Patent
Naitou et al.

(10) Patent No.: US 10,623,588 B2
(45) Date of Patent: Apr. 14, 2020

(54) IMAGE FORMING APPARATUS, IMAGE FORMING METHOD, AND IMAGE FORMING PROGRAM CONFIGURED TO PROCESS IMAGE FORMING FOLLOWING JAM

(71) Applicant: KONICA MINOLTA, INC., Chiyoda-ku, Tokyo (JP)

(72) Inventors: Yasufumi Naitou, Toyokawa (JP); Masatoshi Hitaka, Toyokawa (JP); Hideki Matsumoto, Okazaki (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 15/902,058

(22) Filed: Feb. 22, 2018

(65) Prior Publication Data
US 2018/0255188 A1  Sep. 6, 2018

(30) Foreign Application Priority Data
Mar. 6, 2017  (JP) ................................ 2017-041512

(51) Int. Cl.
 H04N 1/00 (2006.01)
 G03G 15/00 (2006.01)
 H04N 1/32 (2006.01)

(52) U.S. Cl.
 CPC ....... *H04N 1/00037* (2013.01); *H04N 1/0005* (2013.01); *H04N 1/00074* (2013.01); *H04N 1/00082* (2013.01); *H04N 1/00092* (2013.01); *H04N 1/00631* (2013.01); *H04N 1/3263* (2013.01); *G03G 15/5012* (2013.01); *G03G 15/70* (2013.01); *G03G 2215/00341* (2013.01); *G03G 2215/00548* (2013.01); *G03G 2215/00552* (2013.01)

(58) Field of Classification Search
CPC ..... A47K 10/3656; G03G 2215/00341; G03G 2215/1675; G03G 2215/00552; G03G 21/1638; G03G 2215/00548; H04N 1/00543; H04N 1/3263
See application file for complete search history.

(56) References Cited

U.S. PATENT DOCUMENTS

| | | | |
|---|---|---|---|
| 2005/0185222 A1* | 8/2005 | Sammis | G06K 15/00 358/2.1 |
| 2006/0029402 A1* | 2/2006 | Dan | G03G 15/502 399/21 |
| 2006/0145414 A1* | 7/2006 | Yokobori | G03G 15/5012 271/258.01 |
| 2009/0073514 A1* | 3/2009 | Shoji | G03G 15/657 358/498 |

(Continued)

FOREIGN PATENT DOCUMENTS

JP  2008-052125 A  3/2008

*Primary Examiner* — Juan M Guillermety
(74) *Attorney, Agent, or Firm* — Buchanan Ingersoll & Rooney PC

(57) ABSTRACT

An image forming apparatus includes: an image former that performs image forming processing to a plurality of sheets included in each of a plurality of sheet groups; and a hardware processor that detects occurrence of a jam, wherein the image former completes the image forming processing to each of the plurality of sheets included in a sheet group not including a jammed sheet that has generated the jam.

16 Claims, 21 Drawing Sheets

(56) References Cited

U.S. PATENT DOCUMENTS

| | | | |
|---|---|---|---|
| 2009/0214228 A1* | 8/2009 | Ito | G03G 15/70 399/21 |
| 2011/0211888 A1* | 9/2011 | Fujinaga | G03G 15/55 399/403 |
| 2015/0168907 A1* | 6/2015 | Nishi | G03G 15/55 399/21 |
| 2015/0254541 A1* | 9/2015 | Yoshida | G06K 15/1809 358/1.15 |
| 2016/0275389 A1* | 9/2016 | Hara | G06K 15/16 |
| 2017/0023901 A1* | 1/2017 | Asakawa | G03G 15/5012 |

* cited by examiner

*FIG. 6*

| PRINTING SEQUENCE |
|---|
| 1-1/FRONT |
| 1-2/FRONT |
| 1-3/FRONT |
| 1-1/BACK |
| 2-1/FRONT |
| 1-2/BACK |
| 2-2/FRONT |
| 1-3/BACK |
| 2-3/FRONT |
| 2-1/BACK |
| 3-1/FRONT |

| PRINTING SEQUENCE |
|---|
| 1-1/FRONT |
| 1-2/FRONT |
| 1-3/FRONT |
| 1-1/BACK |
| 2-1/FRONT |
| 1-2/BACK |
| 2-2/FRONT |

| | | PAPER FEEDING PREPARATION | IMAGE FORMATION | EJECTION PREPARATION |
|---|---|---|---|---|
| 1-1 | SHEET GROUPS NOT TO BE EJECTED | DONE | DONE | DONE |
| 1-2 | | DONE | DONE | NOT YET |
| 1-3 | | DONE | NOT YET | NOT YET |
| 2-1 | SHEET GROUPS TO BE EJECTED | DONE | NOT YET | NOT YET |
| 2-2 | | DONE | NOT YET | NOT YET |
| 2-3 | | NOT YET | NOT YET | NOT YET |

| PRINTING SEQUENCE |
|---|
| 1-1/FRONT |
| 1-2/FRONT |
| 1-3/FRONT |
| 1-1/BACK |
| 2-1/FRONT |
| 1-2/BACK |
| 2-2/FRONT |
| 1-3/BACK |
| 2-1/BACK |

× (marker next to 1-3/BACK)

| | | PAPER FEEDING PREPARATION | IMAGE FORMATION | EJECTION PREPARATION |
|---|---|---|---|---|
| 1-1 | SHEET GROUPS NOT TO BE EJECTED | DONE | DONE | DONE |
| 1-2 | | DONE | DONE | NOT YET |
| 1-3 | | DONE | NOT YET | NOT YET |
| 2-1 | SHEET GROUPS TO BE EJECTED | DONE | NOT YET | NOT YET |
| 2-2 | | DONE | NOT YET | NOT YET |
| 2-3 | | NOT YET | NOT YET | NOT YET |

NON-FED SHEET

LEAD ←

| | PRINTING SEQUENCE |
|---|---|
| ✕ | 1-1/FRONT |
| | 1-2/FRONT |
| | 1-3/FRONT |
| | 1-1/BACK |
| | 2-1/FRONT |
| | 1-2/BACK |
| | 2-2/FRONT |
| | 1-3/BACK |
| | 2-1/BACK |
| | 2-3/FRONT |

FIG. 9C

| | | PAPER FEEDING PREPARATION | IMAGE FORMATION | EJECTION PREPARATION |
|---|---|---|---|---|
| 1-1 | SHEET GROUPS NOT TO BE EJECTED | DONE | DONE | DONE |
| 1-2 | | DONE | DONE | NOT YET |
| 1-3 | | DONE | NOT YET | NOT YET |
| 2-1 | SHEET GROUPS TO BE EJECTED | DONE | DONE | DONE |
| 2-2 | | DONE | NOT YET | NOT YET |
| 2-3 | | DONE | NOT YET | NOT YET |

FIG. 10B

| | PRINTING SEQUENCE |
|---|---|
| | 1-1/FRONT |
| | 1-2/FRONT |
| | 1-3/FRONT |
| | 1-1/BACK |
| | 2-1/FRONT |
| | 1-2/BACK |
| | 2-2/FRONT |
| ✗ | 1-3/BACK |
| | 2-1/BACK |
| | 2-3/FRONT |
| | 2-2/BACK |
| ✗ | 1-3/BACK |

FIG. 10C

| | | PAPER FEEDING PREPARATION | IMAGE FORMATION | EJECTION PREPARATION |
|---|---|---|---|---|
| 1-1 | SHEET GROUPS NOT TO BE EJECTED | DONE | DONE | DONE |
| 1-2 | | DONE | DONE | NOT YET |
| 1-3 | | DONE | NOT YET | NOT YET |
| 2-1 | SHEET GROUPS TO BE EJECTED | DONE | DONE | DONE |
| 2-2 | | DONE | DONE | DONE |
| 2-3 | | DONE | NOT YET | NOT YET |

FIG. 11B

| PRINTING SEQUENCE |
|---|
| 1-1/FRONT |
| 1-2/FRONT |
| 1-3/FRONT |
| 1-1/BACK |
| 2-1/FRONT |
| 1-2/BACK |
| 2-2/FRONT |
| × 1-3/BACK |
| 2-1/BACK |
| 2-3/FRONT |
| 2-2/BACK |
| × 1-3/BACK |
| 2-3/BACK |

FIG. 11C

|  |  | PAPER FEEDING PREPARATION | IMAGE FORMATION | EJECTION PREPARATION |
|---|---|---|---|---|
| 1-1 | SHEET GROUPS NOT TO BE EJECTED | DONE | DONE | DONE |
| 1-2 |  | DONE | DONE | NOT YET |
| 1-3 |  | DONE | NOT YET | NOT YET |
| 2-1 | SHEET GROUPS TO BE EJECTED | DONE | DONE | DONE |
| 2-2 |  | DONE | DONE | DONE |
| 2-3 |  | DONE | DONE | DONE |

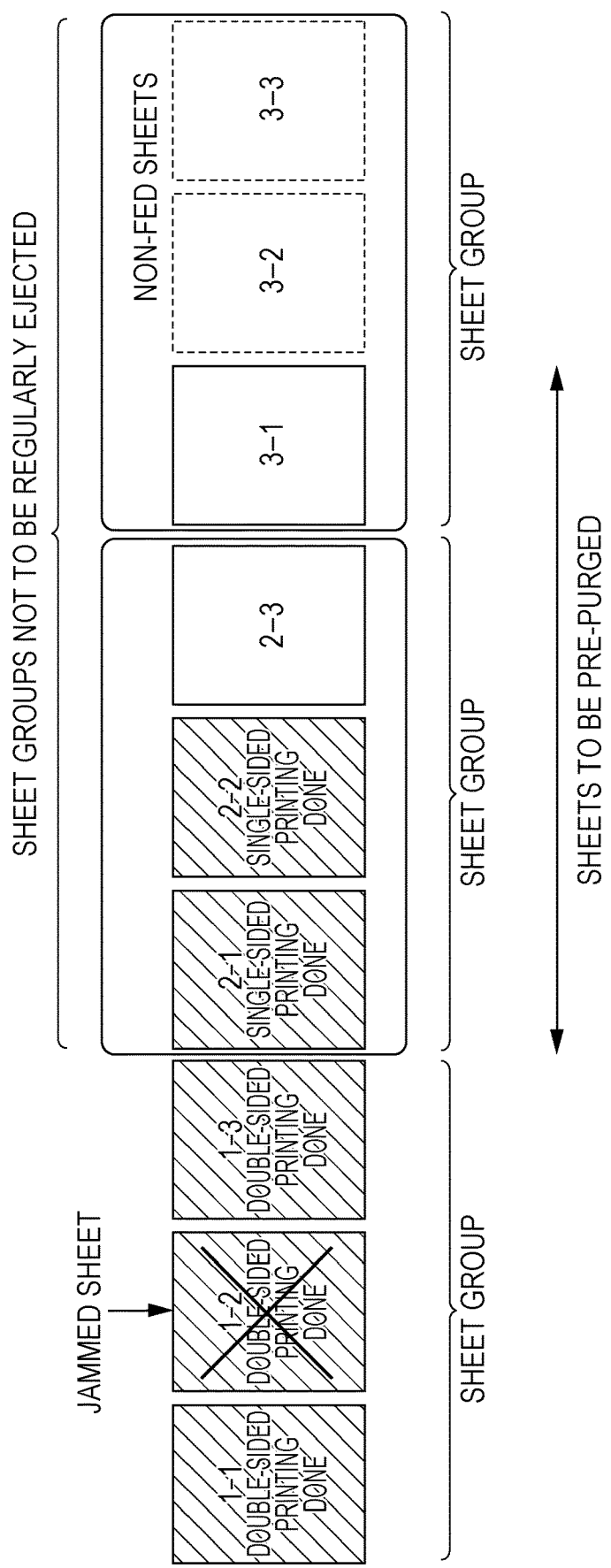

| PRINTING SEQUENCE |
|---|
| 1-1/FRONT |
| 1-2/FRONT |
| 1-3/FRONT |
| 1-1/BACK |
| 2-1/FRONT |
| 1-2/BACK |
| 2-2/FRONT |
| 1-3/BACK |
| 2-3/FRONT |
| 2-1/BACK |
| 3-1/FRONT |

IMAGE FORMING APPARATUS, IMAGE FORMING METHOD, AND IMAGE FORMING PROGRAM CONFIGURED TO PROCESS IMAGE FORMING FOLLOWING JAM

The entire disclosure of Japanese patent Application No. 2017-041512, filed on Mar. 6, 2017, is incorporated herein by reference in its entirety.

BACKGROUND

Technological Field

The present disclosure relates to an image forming apparatus, an image forming method, and an image forming program.

Description of the Related Art

Conventionally, there is an image forming apparatus that performs image forming processing to sheets in a plurality of sets, each set including a predetermined number of sheets. An image forming apparatus described in JP 2008-52125 A, ejects a sheet fed from a paper cassette, in the image forming apparatus, when a jam occurs in the image forming apparatus.

However, the conventional image forming apparatuses each consistently perform processing of ejecting a sheet in the image forming apparatus when a jam occurs, instead of completing image forming processing on the basis of a job. Therefore, depending on the timing when the jam occurs, a sheet is ejected out of the sequence of the image forming processing specified by the job, or a set having the image forming processing not completed, is ejected. Thus, a user needs to check whether the image forming processing has been accurately performed to the ejected sheet on the basis of the job, resulting in a burden to the user.

SUMMARY

The present disclosure has been made in consideration of the issue, and an object of the present disclosure is to provide an image forming apparatus that reduces a burden to a user even when a jam occurs, an image forming method, and an image forming program.

To achieve the abovementioned object, according to an aspect of the present invention, an image forming apparatus c reflecting one aspect of the present invention comprises: an image former that performs image forming processing to a plurality of sheets included in each of a plurality of sheet groups; and a hardware processor that detects occurrence of a jam, wherein the image former completes the image forming processing to each of the plurality of sheets included in a sheet group not including a jammed sheet that has generated the jam.

BRIEF DESCRIPTION OF THE DRAWINGS

The advantages and features provided by one or more embodiments of the invention will become more fully understood from the detailed description given hereinbelow and the appended drawings which are given by way of illustration only, and thus are not intended as a definition of the limits of the present invention:

FIG. 6 is a table for describing a printing sequence;

FIGS. 9A to 9C are a diagram and tables for describing control when the jam occurs;

FIGS. 10A to 10C are a diagram and tables for describing control when the jam occurs;

FIGS. 11A to 11C are a diagram and tables for describing control when the jam occurs;

FIGS. 16A to 16C are diagrams and a table for describing control in a conventional technique.

DETAILED DESCRIPTION OF EMBODIMENTS

Hereinafter, one or more embodiments of the present invention will be described with reference to the drawings. However, the scope of the invention is not limited to the disclosed embodiments. The same components and constituent elements are denoted with the same reference signs in the following descriptions. Those designations and functions are identical. Therefore, the descriptions thereof will not be repeated.

[Configuration of Image Forming Apparatus]

Figure 1:
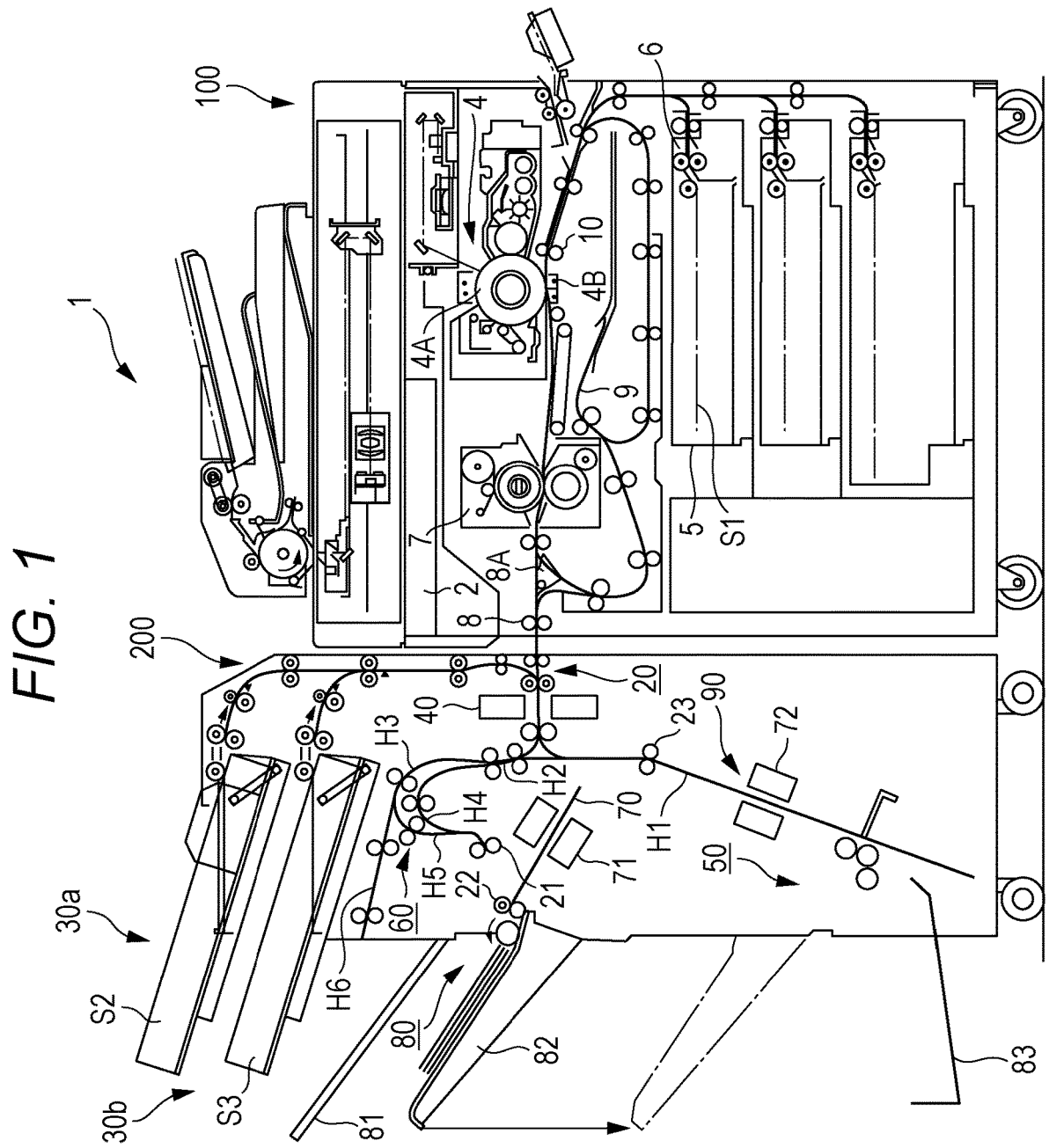
FIG. 1 is an overall view for describing an exemplary configuration of an image forming system.

FIG. 1 is an overall view of an image forming system 1 including an image forming apparatus 100 and a post-processing apparatus 200. Examples of the image forming apparatus 100 include a printer, a facsimile, a copying machine, a plotter, and a multi-function printer thereof. The image forming apparatus 100 of FIG. 1 includes an image former 4, a paper cassette 5, a paper feeding roller 6, a fusing apparatus 7, and an ejecting roller 8. The image former 4 is capable of performing image forming processing of forming an image to a sheet. The image forming processing may be referred to as "printing". The paper cassette 5 is a container that houses sheets. Processing performed by the image forming apparatus 100 and the post-processing apparatus 200, is also referred to as a "job". The image forming system 1 may be referred to as an "image forming apparatus".

Figure 2:
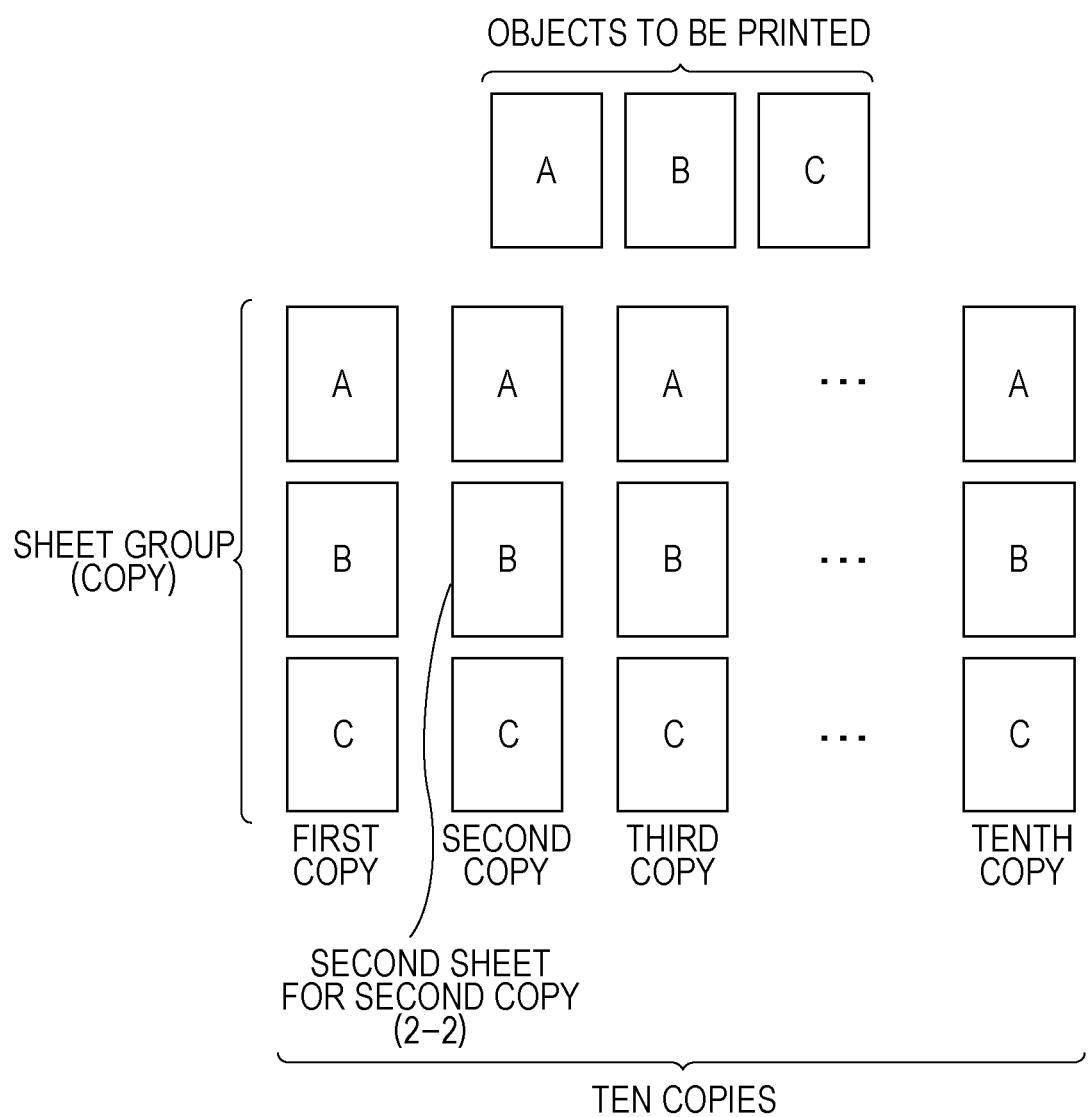
FIG. 2 is a diagram for describing sheet groups.

The image former 4 is capable of performing the image forming processing to a plurality of sheets included in each of a plurality of sheet groups. The image forming processing is also referred to as "multiple image forming processing" or "multiple printing processing", below. FIG. 2 is a diagram for describing the multiple printing processing. The example of FIG. 2 illustrates that "an object to be printed A, an object to be printed B, and an object to be printed C" are grouped as one set and each is printed for ten copies. In this manner, the image forming apparatus 100 can perform the image forming processing to the plurality of sheets included in each of the ten sheet groups (namely, thirty sheets). In other words, the image forming apparatus 100 performs printing to each of the three sheets included in one sheet group, on the basis of three types of image data (namely, respective pieces of image data of images described in the three objects to be printed), and thus is capable of performing the printing processing to the ten sheet groups. One sheet group may be referred to as "a copy", below. As illustrated in FIG. 2, an expression such as "a second sheet for a second copy" may be used. The numerical value of a copy and the numerical value of a sheet may be expressed as "the numerical value of the copy-the numerical value of the sheet", below. For example, "2-2" may be indicated for the second sheet for the second copy. The sheets for an x-th copy may be collectively referred to as the "x-th sheet group".

The image forming apparatus 100 forms a latent image corresponding to an image to be formed, with irradiation to a photoconductor drum 4A of the image former 4. The image forming apparatus 100 performs processing, such as electrification, exposure, development, transfer, separation, and cleaning, to the image former 4 to form a toner image onto the photoconductor drum 4A.

A sheet S1 fed from the paper cassette 5 by the paper feeding roller 6, is temporarily stopped by a timing roller 10 in order to synchronize with the image, and then the timing roller 10 drives at the timing at which image preparation is made. After that, the sheet S1 arrives at the photoconductor drum 4A and then a transferer 4B transfers the toner image to the sheet S1. The fusing apparatus 7 performs fusing processing to the sheet S1 supporting the toner image, and the sheet S1 is sent from the ejecting roller 8 to the post-processing apparatus 200. For double-sided copying, a conveying path switching board 8A sends the sheet S1 having the single-sided image processing already performed, to an automatic double-sided copying paper feeder 9. The image former 4 transfers the toner image to the back surface, and fusing is performed. After that, the sheet S1 is sent from the ejecting roller 8 to the post-processing apparatus 200.

The post-processing apparatus 200 is coupled to the ejecting roller 8 side being the left side surface of the image forming apparatus 100 in FIG. 1. The post-processing apparatus 200 includes a sheet conveyer 20, insertion-sheet paper feeders 30a and 30b, and a plurality of post-processors. The plurality of post-processors includes a punching processor 40, a folder 50, a superposing processor 60, a stitching (side-stitching) processor 71, a saddle-stitching processor 72, and a paper ejector 80. Sheets to be inserted S2 are loaded into the insertion-sheet paper feeder 30a, and different sheets to be inserted S3 are loaded into the insertion-sheet paper feeder 30b. The sheets to be inserted S2 and S3 each are a cover sheet or an inserting sheet to be inserted between a plurality of recording sheets S1 ejected from the image forming apparatus 100. Punching processing or folding processing can be performed to the sheets to be inserted S2 and S3, similarly to the recording sheets S1. The recording sheets S1 and the sheets to be inserted S2 and S3 are also collectively referred to as sheets S in the following descriptions. A sheet S sent from the insertion-sheet paper feeder 30a or 30b, is conveyed to the sheet conveyer 20 through a conveying path leading downward.

The punching processor 40 is disposed on the left downstream side of the sheet conveyer 20, and punches a sheet S. A conveying path H1 branching downward, downstream from the punching processor 40, leads to a sheet stacker 90 through a conveying roller 23. The saddle-stitching processor 72 and the folder 50 are disposed in the sheet stacker 90.

The superposing processor 60 is provided on the downstream side of a conveying path H2 branching upward, downstream from the punching processor 40, and includes conveying paths H3, H4, and H5. In order for the stitching processor 71 to ensure a time for performing stitching processing to leading sheets S, the stitching processor 71 being positioned on the downstream side of the superposing processor 60, the superposing processor 60 puts the subsequent sheets S for a second copy or beyond on standby at the conveying paths H3, H4, and H5. A conveying path positioned on the downstream side of the conveying path H2, branches into doubly curved conveying paths, resulting in branching to the internal conveying path H4 and the external conveying paths H3 and H5.

A conveying roller 21 is provided at the outlet of the internal conveying path H4 branching and curving from the conveying path H2. In performing the stitching processing, the sheets S for a first copy are sequentially sent to an accumulator 70 through the conveying paths H2 and H4 and the conveying roller 21, and the accumulator 70 performs the stitching processing to the sheets S.

When a first sheet of the sheets S for the second copy or beyond is conveyed, the conveying roller 21 receives the leading edge of the sheet, keeping the rotation stopping, and puts the sheet on standby with the leading edge of the sheet abutting on the nip of the conveying roller 21.

The sheet S conveyed through the conveying path H4 is on standby with the leading edge thereof abutting on the conveying roller 21. The next sheet S enters the conveying path H3 from the conveying path H2 and arrives at the conveying roller 21 through the conveying path H5. When the leading sheet S and the subsequent sheet S are superposed with the leading edges thereof abutting on the conveying roller 21, the conveying roller 21 rotates and conveys the two together to the accumulator 70. In this manner, the superposing processor 60 puts the sheets S for the second copy or beyond, on standby until the stitching processing to the leading sheet batch is completed. Therefore, the post-processing apparatus 200 can prevent the productivity of the stitching processing from degrading.

The conveying path H3 downstream from the conveying path H2, further branches into the conveying path H5 and a conveying path H6. The conveying path H6 is for ejecting a sheet S to a fixed ejected-paper tray 81 being part of the paper ejector 80. The fixed ejected-paper tray 81 is provided at a position protruding outward from the post-processing apparatus 200, on the downstream side of the conveying path H6, and is used for accumulating a small number of sheets S.

The paper ejector 80 includes an ascent/descent ejected-paper tray 82 and a lower ejected-paper tray 83. An ejecting roller 22, the accumulator 70, the stitching processor 71, and an adjuster not illustrated are disposed between the conveying roller 21 and the ascent/descent ejected-paper tray 82. The ejecting roller 22 includes a pair of rollers. The pair of rollers mutually separates in non-ejection, and mutually comes in contact in ejection to eject sheets S to the ascent/descent ejected-paper tray 82.

A sheet S conveyed by the conveying roller 21 travels left in the figure, between the pair of rollers mutually separating, in the ejecting roller 22. After the rear end leaves the conveying roller 21, the sheet S falls onto the accumulator 70 and slides on the accumulator 70 slanting. Then, the sheet S is received by a stopper (not illustrated) and stops on the accumulator 70. Sheets S are sequentially ejected and a predetermined number of sheets S are accumulated on the accumulator 70, so that the stitching processor 71 operates to perform the stitching processing to the end surface on the stopper side of the sheets S.

The sheets S to which the stitching processing has been performed, are pushed up by the stopper, so that the sheets S move left upward on the accumulator 70. In this case, in the post-processing apparatus 200, the pair of rollers included in the ejecting roller 22, mutually comes in contact, to nip and convey the sheets S, and then the sheets S are ejected to the ascent/descent ejected-paper tray 82.

When the image forming apparatus 100 performs a large amount of image formation without performing the post-processing, sheets S travel from the sheet conveyer 20 through the conveying paths H2 and H4, so that the sheets S are ejected to the ascent/descent ejected-paper tray 82. The ascent/descent ejected-paper tray 82 moves downward as shown by the chain line such that the uppermost surface of sheets S to be ejected remains at a constant height. Therefore, thousands of sheets S can be accumulated on the ascent/descent ejected-paper tray 82.

The sheet stacker 90 is provided oblique to the horizontal direction, downstream from the conveying roller 23. The sheet stacker 90 includes a plurality of guide members and regulating members that guides a sheet S, the saddle-stitching processor 72, and the folder 50. The sheet stacker 90 performs processing to one sheet S or more in a center-fold mode, a center-fold and saddle-stitch mode, or a double-hold mode, and then ejects the one sheet S or more to the lower ejected-paper tray 83.

In this manner, the post-processing apparatus 200 according to the present embodiment, includes a plurality of ejecting paths and a plurality of ejectors corresponding to the plurality of ejecting paths. According to the present embodiment, the plurality of ejecting paths includes three ejecting paths.

A first ejecting path from the three ejecting paths, includes the conveying path H2, the conveying path H3, and the conveying path H6. A first ejector corresponding to the first ejecting path is the fixed ejected-paper tray 81. A second ejecting path includes the conveying path H2, the conveying path H3, and the conveying path H5. Alternatively, the second ejecting path includes the conveying path H2 and the conveying path H4. A second ejector corresponding to the second ejecting path is the ascent/descent ejected-paper tray 82. A third ejecting path includes the conveying path H1. A third ejector corresponding to the third ejecting path is the lower ejected-paper tray 83.

[Hardware Configurations of Image Forming Apparatus and Post-Processing Apparatus]

Figure 3:
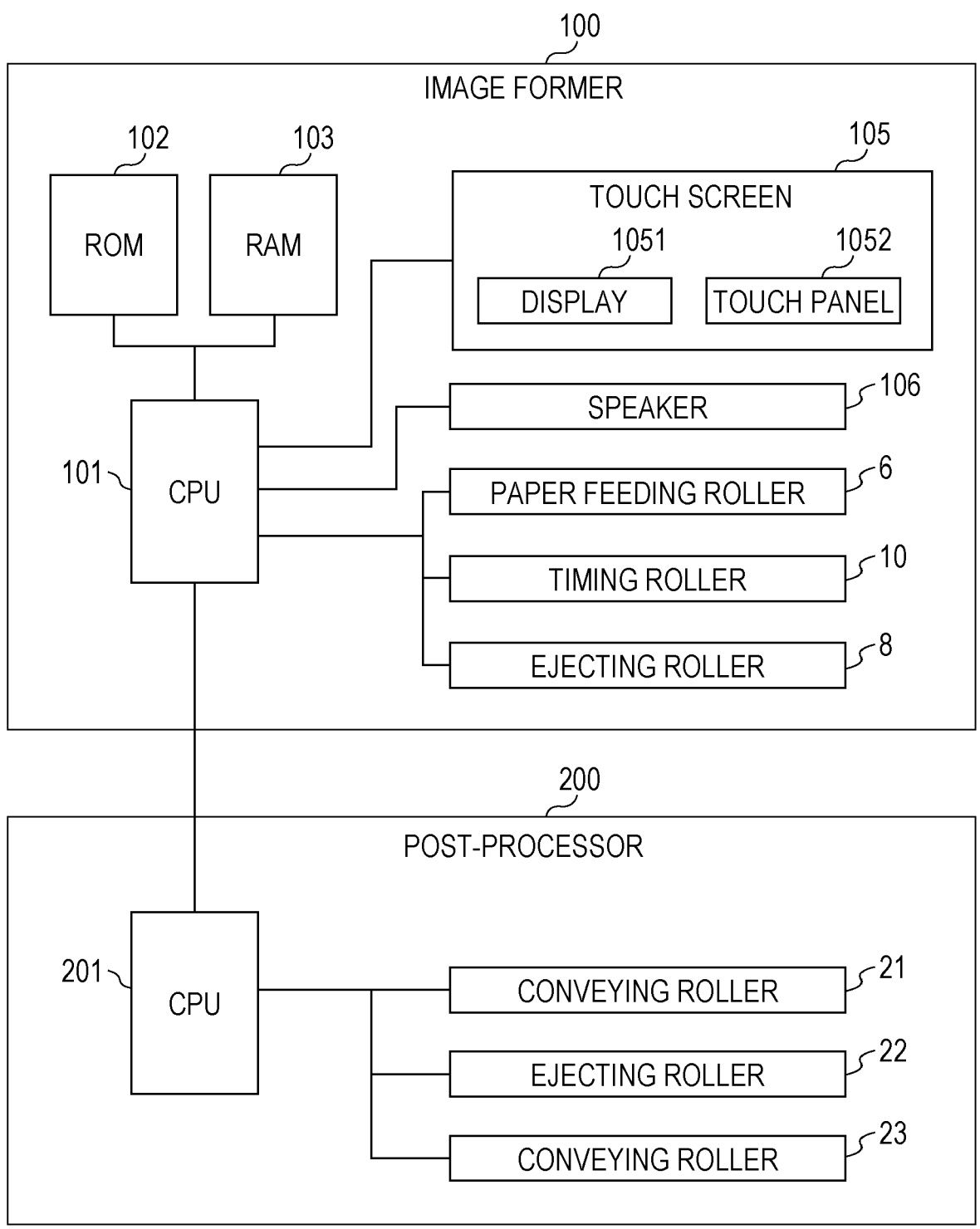
FIG. 3 is a diagram for describing the hardware configurations of an image forming apparatus and a post-processing apparatus.

Next, the hardware configurations of the image forming apparatus 100 and the post-processing apparatus 200, will be described with FIG. 3. FIG. 3 is a diagram for describing the hardware configurations of the image forming apparatus 100 and the post-processing apparatus 200. The image forming apparatus 100 includes a central processing unit (CPU) 101 that executes a program, a read only memory (ROM) 102 that stores data in a nonvolatile manner, a random access memory (RAM) 103 that stores data in a volatile manner, a touch screen 105, and a speaker 106.

The touch screen 105 includes a display 1051 as a display apparatus and a touch panel 1052 as an input apparatus. Specifically, the touch screen 105 is achieved by positioning and fixing the touch panel 1052 onto the display 1051 (e.g., a liquid crystal display). Note that, the touch screen is also referred to as a touch panel display, a display equipped with a touch panel, or a touch panel monitor. Note that, a resistive film method or a capacitance method can be used as a method of detecting a touched position in the touch screen 105. The speaker 106 generates a sound in response to a command from the CPU 101. The touch panel 1052 is an input device that receives an input (a touch input) by a finger of a user or a stylus pen.

The CPU 101 reads the program from the ROM 102 and uniformly controls each operation with timing. For example, the CPU 101 smoothly performs an operation, such as the performance of the image forming processing (printing processing). The CPU 101 mainly controls the paper feeding roller 6, the timing roller 10, and the ejecting roller 8 to convey a sheet S.

The post-processing apparatus 200 includes a CPU 201. The CPU 201 performs the post-processing, such as stapling processing, punching processing, or folding processing, in connection with the CPU 101 in the image former 100. The post-processing apparatus 200 mainly controls the conveying roller 21, the ejecting roller 22, and the conveying roller 23 to convey a sheet S.

[Control Apparatus 300]

Figure 4:
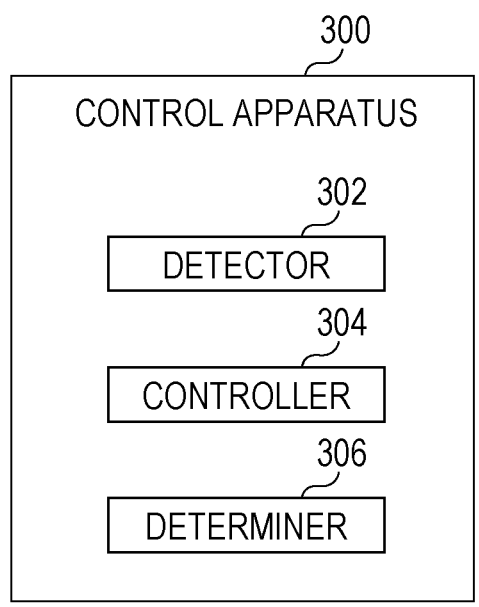
FIG. 4 is a diagram for describing an exemplary functional configuration of a control apparatus.

A control apparatus 300 according to the present embodiment, will be described with FIG. 4. FIG. 4 is a diagram for describing the control apparatus 300. The control apparatus 300 is achieved by integrating the function of the CPU 101, the function of the ROM 102, the function of RAM 103, and the function of the CPU 201 described in FIG. 3. The control apparatus 300 includes the function of a detector 302, the function of a controller 304, and the function of a determiner 306.

The detector 302 detects occurrence of a jam. The jam means that a sheet jams inside the image forming apparatus 100 or the post-processing apparatus 200. An exemplary method of detecting the jam, will be described. A sensor (e.g., an optical sensor) is disposed at each part of each conveying path. The sensor detects transit of a sheet at the part, and when an inter-part transit time reaches a predetermined time or more, the detector 302 detects that the jam has occurred. A different method may be used for the method of detecting the jam. The sheet generating the jam (namely, a sheet that has jammed) is also referred to as a "jammed sheet". The post-processing apparatus 200 can specify the position of the sheet with the sensor.

The detector 302 performs various types of control. For example, the detector 302 causes the image former 4 to perform the printing processing or a sheet housed in the paper cassette 5 to be fed to the image former 4. The determiner 306 performs various types of determination. The detailed determination contents of the determiner 306 will be described later.

[Processing of Control Apparatus 300]

Figure 5:
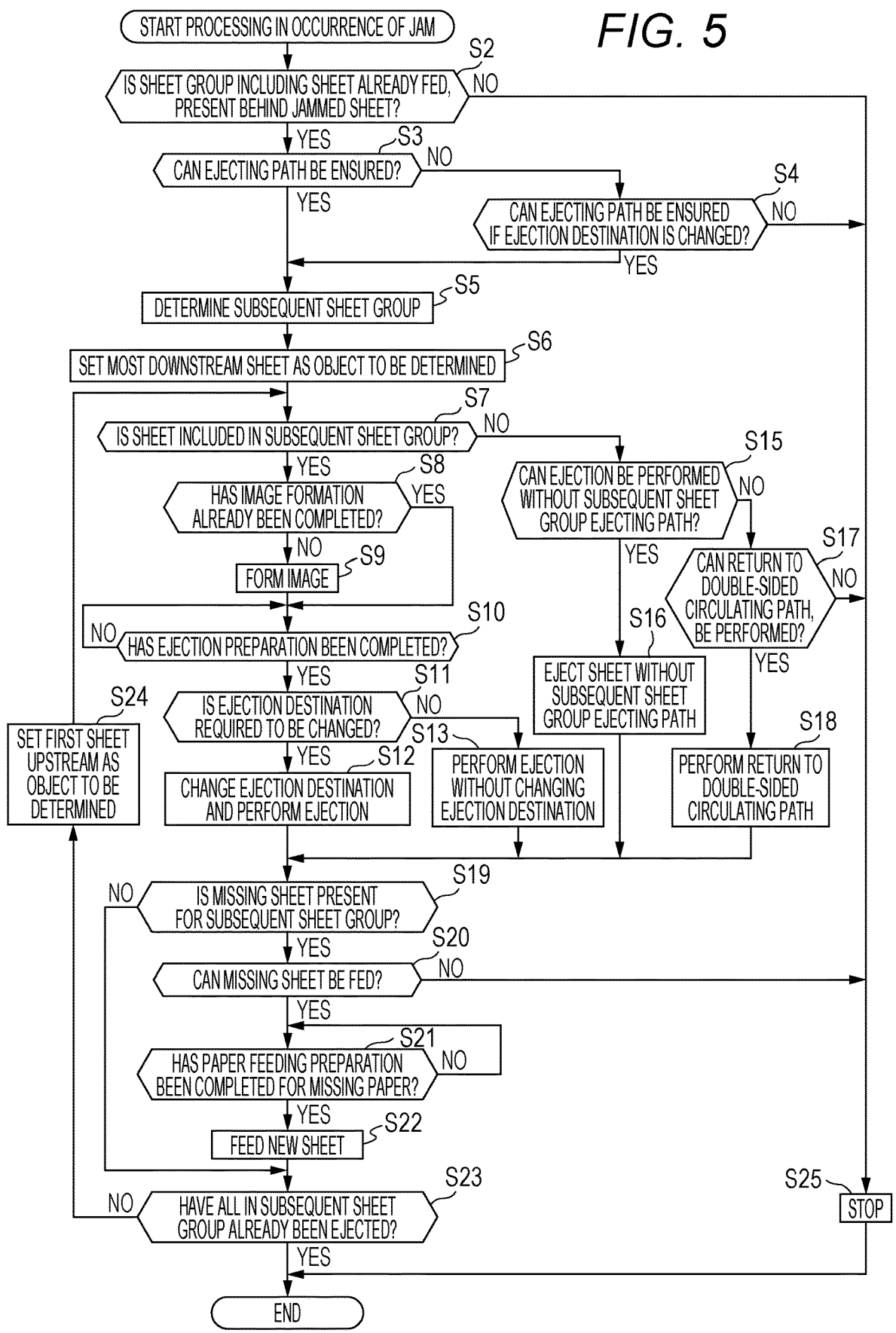
FIG. 5 is a flowchart for describing processing in the control apparatus.

Next, processing performed by the control apparatus 300 when the detector 302 detects the jam, will be described with FIG. 5. FIG. 5 is a flowchart for describing the processing. As a premise here, a job input by the user is defined for performing three-copies copying of one set of three sheets (performing multiple printing processing), double-side copying, and center-folding as the post-processing. The maximum number of sheets allowed to be housed in the conveying path of the image forming apparatus 100 is defined three. According to the present embodiment, as described above, the three ejectors (ejection destinations) are provided, but here the lower ejected-paper tray 83 is set as the ejector since folding processing is to be performed.

FIG. 6 is a table illustrating a printing sequence in processing of multiple printing of the three copies copying and the double-sided printing. As illustrated in FIG. 6, the printing processing is performed in the sequence of the front surface of 1-1, the front surface of 1-2, the front surface of 1-3, . . . , and the front surface of 3-1. For the printing sequence, first, the printing processing is performed to the front surfaces of the three sheets for the first copy, and then the printing processing is performed in the sequence of the back surface, the front surface, the back surface, and the front surface. This arrangement allows the image forming apparatus 100 to perform the printing processing efficiently. Note that, the printing sequence of FIG. 6 is not limited to this, and thus may be replaced with a different printing sequence.

For example, when the jam occurs in 1-1, the sheet of 1-2 and the sheet of 1-3 are stayed as far as possible in the image forming apparatus 100, with the processing of FIG. 5. For the second sheet group (the sheet of 2-1, the sheet of 2-2, and the sheet of 2-3), the image formation is completed as far as possible and ejection is performed, with the processing of FIG. 5. For the third sheet group, no printing processing is performed.

At S2, it is determined whether a sheet has already been fed in the subsequent sheet group to the sheet group to which the jammed sheet belongs. For example, when the sheet of 1-1 (a sheet belonging to the first sheet group) is the jammed sheet, it is determined whether at least one sheet in the second sheet group has already been fed to the image former 4, with the processing at S2.

When NO is determined at S2, the processing proceeds to S25. At S25, the controller 304 stops the image forming processing. At S25, the controller 304 may notify the user that the image forming processing is to be stopped. For example, the notification includes at least one of a piece of processing of outputting a notification sound (e.g., a high-pitched tone) through the speaker 106 and a piece of processing of displaying notification information onto the display 1051. The notification sound includes, for example, a high-pitched tone. The notification information includes, for example, characters showing "image forming processing is to be stopped".

When YES is determined at S2, the processing proceeds to S3. At S3, the determiner 306 determines, as a path determiner, whether an ejecting path can be ensured. For example, when the jam occurs on the conveying path H1, the controller 304 cannot perform the ejection to the lower ejected-paper tray 83 as the ejector. In this case, it is determined that the ejecting path cannot be ensured, and then NO is determined at S3. Meanwhile, for example, even when the jam occurs on the conveying path H2, the controller 304 can perform the ejection to the lower ejected-paper tray 83 as the ejector. In this case, it is determined that the ejecting path can be ensured, and thus YES is determined at S3.

When NO is determined at S3, the processing proceeds to S4. At S4, the determiner 306 determines whether an ejecting path can be ensured if the ejection destination is changed. For example, when the jam occurs on the conveying path H1, the controller 304 cannot perform the ejection to the lower ejected-paper tray 83 as the ejector. However, if the ejection destination is changed to a different ejection destination (e.g., to the fixed ejected-paper tray 81 or the ascent/descent ejected-paper tray 82), the controller 304 can perform the ejection to the different ejection destination. In this case, it is determined that the ejecting path can be ensured if the ejection destination is changed, and thus YES is determined at S4. When YES is determined at S4, the processing proceeds to S5.

Meanwhile, for example, when the jam occurs at the position of the sheet conveyer 20, the ejection cannot be performed even when the ejection destination is changed to any of the other ejection destinations. In this case, it is determined that no ejecting path can be ensured even when the ejection destination is changed, and thus NO is determined at S4. When NO is determined at S4, the processing proceeds to S25.

At S5, the controller 304 determines the following sheet group. Here, the "following sheet group" will be described. The "following sheet group" is the sheet group to which a sheet next in the printing sequence belongs, in the sheet groups each in which all have not been completely ejected yet, except the sheet group including the jammed sheet. For example, when any of the sheets in the first sheet group is the jammed sheet, the "following sheet group" is the second sheet group. Under a condition where all in the sheet group for the first copy have not been completely ejected yet, when any of the sheets in the second sheet group is the jammed sheet, the "following sheet group" is the first sheet group. Under a condition where the image forming processing has been completed to all in the first sheet group and the sheet group has been ejected, when any of the sheets in the second sheet group is the jammed sheet, the "following sheet group" is the sheet group for the third copy. When the processing at S5 finishes, the processing proceeds to S6. The "following sheet group" is also referred to as the "subsequent sheet group", below.

At S6, the controller 304 sets the most downstream sheet in the sheets present in the post-processing apparatus 200, as a sheet being an object to be determined (hereinafter, also referred to as a "sheet to be determined"). When the processing at S6 finishes, the processing proceeds to S7. After the setting of the sheet to be determined, conveying of the sheets other than the sheet to be determined, continues for performing each piece of processing illustrated in FIG. 5.

In the processing at S7, the determiner 306 determines whether the sheet to be determined is a sheet in the subsequent sheet group. When YES is determined at S7, namely, when it is determined that the sheet to be determined is the sheet in the subsequent sheet group, the processing proceeds to S8. For example, when the sheet of 1-1 is the jammed sheet and the sheet being the object to be determined is the sheet of 2-1, YES is determined at S8.

At S8, the determiner 306 determines whether the sheet being the object to be determined has the image formation already completed. When it is determined that the image formation has not been completed yet (NO at S8), the processing proceeds to S9. At S9, the controller 304 returns the sheet being the object to be determined, to the image former 4, and performs the image forming processing to the sheet. When the processing at S9 finishes, the processing proceeds to S10. When YES is determined at S8, the processing proceeds to S10.

At S10, the determiner 306 determines whether ejection preparation has been completed. During the determination processing, the determiner 306 determines whether the sheet to be determined can be ejected (whether the ejection preparation has been completed) with determination of whether the sheet is in the orderly sequence for the copy to be ejected and whether the sheet is still being conveyed on the ejecting path. When it is determined that the ejection preparation has been completed, with the determination (YES at S10), the processing proceeds to S11. At S10, a standby mode continues until YES is determined (NO at S10). Note that, even during the standby period at S10, the conveying of the sheets different from the sheet to be determined, continues.

At S11, the determiner 306 determines whether the ejection destination for the sheet to be determined is required to be changed. When YES is determined at S11, the processing proceeds to S12. When NO is determined at S11, the processing proceeds to S13.

At S12, the controller 304 changes the ejection destination and ejects the sheet to be determined. At S13, the controller 304 does not change the ejection destination but ejects the sheet to be determined.

When the processing at S12 or S13 finishes, the processing proceeds to S19. At S19, the determiner 306 determines whether a missing sheet is present for each of the sheets in the subsequent sheet group to which the sheet to be determined belongs. Here, the presence of the missing sheet shows that a non-fed sheet is present. When YES is determined at S19, the processing proceeds to S20. At S20, the determiner 306 determines whether paper feeding can be performed for the missing sheet. For the determination at S20, YES is determined at S20 if a sheet remains in the paper cassette 5, and NO is determined at S20 if no sheet remains in the paper cassette 5.

When YES is determined at S20, the processing proceeds to S21. At S21, the determiner 306 determines whether paper feeding preparation has been completed for the missing sheet. As described above, the maximum number of sheets allowed to be housed in the conveying path in the image forming apparatus 100, is three. When three sheets are present on the conveying path in the image forming apparatus 100, NO is determined in the processing at S21. When NO is determined at S21, a standby mode continues until YES is determined at S21. Even during the standby period, the conveying of the sheets including the sheet to be determined, continues.

Meanwhile, when the number of sheets present on the conveying path in the image forming apparatus 100 is less than three, YES is determined in the processing at S21. When YES is determined at S21, the processing proceeds to S22. At S22, the controller 304 feeds a new sheet. When the processing at S22 finishes, the processing proceeds to S23.

At S23, the determiner 306 determines whether all the sheets in the subsequent sheet group have already been ejected. When NO is determined at S23, the processing proceeds to S24. At S23, when YES is determined, the processing in the occurrence of the jam finishes.

At S24, the controller 304 sets a first sheet on the upstream side of the sheet to be determined that has been set, as a new sheet to be determined. When the processing at S24 finishes, the processing goes back to S7.

Meanwhile, when NO is determined at S7, namely, when it is determined that the sheet to be determined is a sheet in the non-subsequent sheet group (when it is determined that the sheet to be determined is not a sheet in the subsequent sheet group), the processing proceeds to S15. The "non-subsequent sheet group" is, for example, the copy to which the sheet that has generated the jam belongs. For example, when the jam occurs in 1-1, the sheets in the non-subsequent sheet group are the sheet of 1-2 and the sheet of 1-3.

At S15, the determiner 306 determines whether ejection can be performed with an ejecting path except a subsequent sheet group ejecting path. Here, the subsequent sheet group ejecting path is used for conveying the sheets in the subsequent sheet group. When YES is determined at S15, the processing proceeds to S16. At S16, the sheet is conveyed to the ejecting path except the subsequent sheet group ejecting path. When NO is determined at S15, the processing proceeds to S17.

At S17, the determiner 306 determines whether the sheet to be determined can be returned to a reverse path (also referred to as a double-sided circulating path). Here, the reverse path is a loop path formed by, for example, the automatic double-sided copying paper feeder 9. The determination at S17 is made on the basis of whether the jam has occurred on the reverse path and whether the number of finished sheets on the reverse path is less than three. When determining that the jam has not occurred on the reverse path and the number of finished sheets on the reverse path is less than three, the determiner 306 determines YES at S17. When determining at least that the jam has occurred on the reverse path or that the number of finished sheets is less than three, the determiner 306 determines NO at S17. When NO is determined at S17, the processing proceeds to S25 When YES is determined at S17, the processing proceeds to S18. At S18, the controller 304 returns the sheet to be determined to the reverse path. After the processing at S18 finishes, the processing proceeds to S19.

[Processing Corresponding to Conditions]

Next, on the basis of the premise described above, the processing in the image forming system 1 corresponding to various conditions, will be described with FIGS. 7 to 15. FIGS. 7A, 8A, 9A, 10A, and 11A each simply illustrate the image forming apparatus 100 and the post-processing apparatus 200. For example, the conveying paths and the ejection destinations are illustrated in each of the drawings of FIGS. 7A, 8A, 9A, 10A, and 11A. Thick lines represent sheets and thin lines represent the conveying paths in each of the drawings of FIGS. 7A, 8A, 9A, 10A, and 11A. "x" represents the jammed sheet in each of the drawings of FIGS. 7A, 8A, 9A, 10A, and 11A.

FIGS. 7B, 8B, 9B, 10B, and 11B each illustrate the printing sequence of the fed sheets. Note that the tables of FIGS. 7B, 8B, 9B, 10B, and 11B are the same as that of FIG. 6. FIGS. 7C, 8C, 9C, 10C, and 11C are tables each illustrating the conditions of the paper feeding preparation, the image forming processing, and the ejection preparation, for each sheet. FIGS. 7D and 8D each illustrate a non-fed sheet.

Figure 7A:
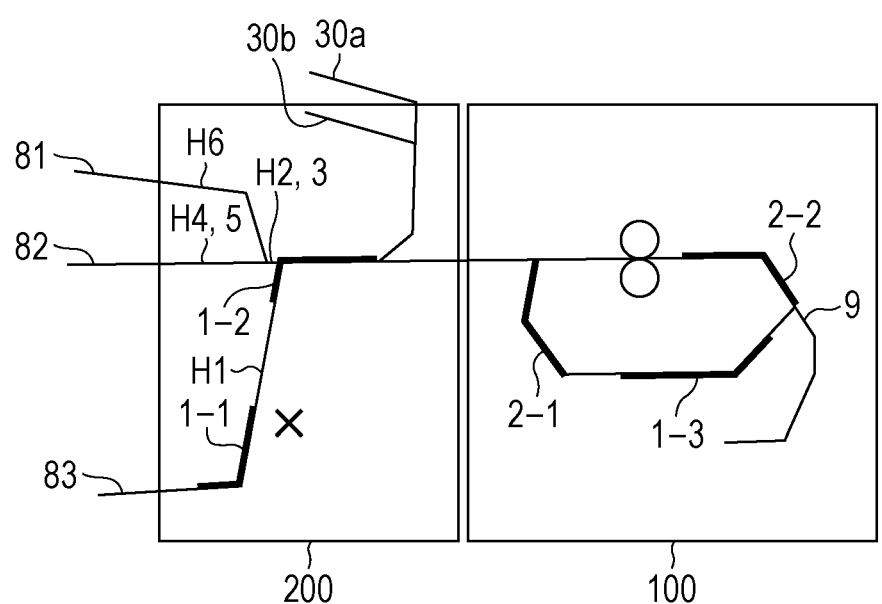
FIGS. 7A to 7D are diagrams and tables for describing control when a jam occurs.
Figures 7B, 7C, 7D:
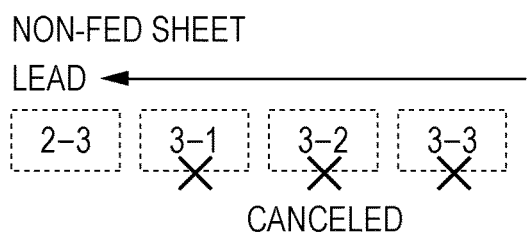
Figure 8A:
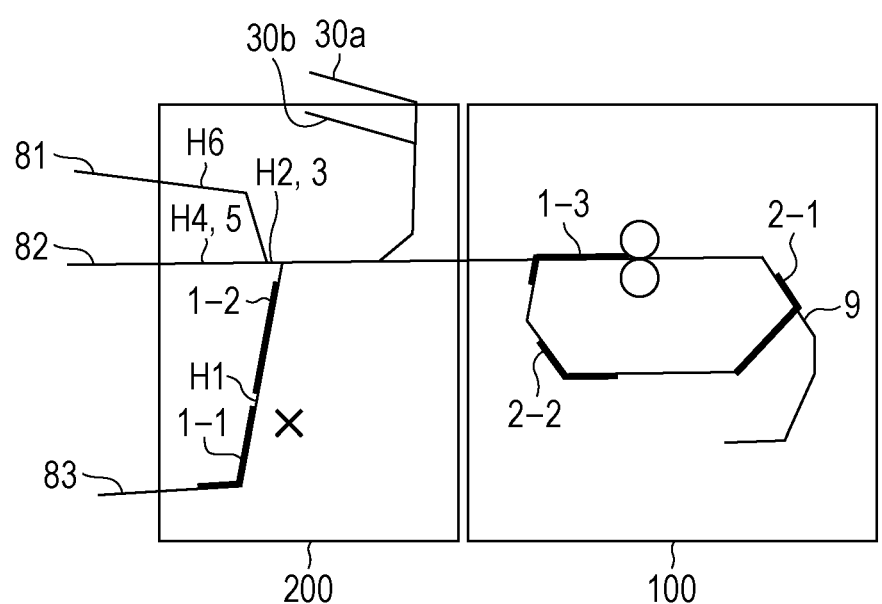
FIGS. 8A to 8D are diagrams and tables for describing control when the jam occurs.
Figures 8B, 8C, 8D:

The example of FIG. 7A illustrates that the sheet of 1-1 is the jammed sheet on the conveying path H1. In this case, as illustrated in FIG. 7C, the sheets of 1-1 to 1-3 are not to be ejected and the sheets of 2-1 to 2-3 are to be ejected. Note that, the image formation is not performed to the sheets of 3-1 to 3-3 (canceled as illustrated in FIG. 7D).

As illustrated in FIG. 7C, the sheets of 1-1 to 1-3 have already been fed. The sheet of 1-1 and the sheet of 1-2 have the image formation already completed. The sheet of 1-1 has the ejection preparation completed, but the sheet is the jammed sheet. In the condition of FIG. 7A, the sheet of 2-3 is the non-fed sheet.

In this case, a case where the sheet of 1-2 is set as the sheet to be determined at S6, will be described. At S7, the determiner 306 determines that the sheet of 1-2 is a sheet in the non-subsequent sheet group (NO at S7). After that, the determiner 306 determines whether evacuation can be performed without the subsequent sheet group ejecting path. In this case, the controller 304 evacuates the sheet of 1-2 to the conveying path H1 on which the jammed sheet stays. FIGS. 8A to 8D illustrate the condition after the evacuation. In this manner, when NO is determined at S7, processing of determining whether the sheet of 1-2 can be evacuated to a region except the subsequent sheet group ejecting path, may be performed at S15', instead of performing the processing at S15 and S16. When YES is determined at S15', the evacuation may be performed to the region except the subsequent sheet group ejecting path (namely, the conveying path H1) at S16'. Note that, as illustrated in FIG. 5, when NO is determined at S7, the performance of the processing at S15 and S16 may allow the sheet of 1-2 to be ejected.

Next, a case where the sheet of 1-3 is set as the sheet to be determined at S6, will be described. At S7, the determiner 306 determines that the sheet of 1-3 is a sheet in the subsequent sheet group (YES at S7). At S8, it is determined that the sheet has no image formation completed, and thus the image formation is performed to the sheet at S9. At this time, since the sheet of 2-1 has not been ejected and a second surface of the sheet has no image formed, it is determined that the ejection preparation has not been completed, at S10 (NO at S10). Therefore, the controller 304 remains on standby until YES is determined at S10. Note that, during the standby period, the conveying of the other sheets continues. Here, the sheet of 2-1 is returned to the reverse path (conveyed).

Next, a case where the sheet of 1-3 is set as the sheet to be determined at S6, will be described. At S7, the determiner 306 determines that the sheet of 1-3 is a sheet in the non-subsequent sheet group (NO at S7). After that, it is determined that the sheet of 1-3 cannot be ejected, at S15 (NO at S15), and it is determined that the sheet of 1-3 can be returned to the reverse path, at S17 (YES at S17). Thus, the sheet of 1-3 is retained on the reverse path until all in the second sheet group are completely ejected. The back surface of the sheet of 1-3 has no image formation performed, but the image formation is not performed to the back surface of the sheet of 1-3 since the sheet of 1-3 is not to be ejected. This is as indicated with the mark of x of FIG. 8B.

After that, it is determined that a missing sheet is present since the sheet of 2-3 is the non-fed sheet, at S19, and it is determined whether the paper feeding can be performed, at S20. After YES is determined at S20, it is determined whether the paper feeding preparation has been completed, at S21. Here, it is determined that the paper feeding preparation has not been completed since three sheets are already present in the image forming apparatus 100, and the standby mode continues until YES is determined at S21.

Figure 9A:
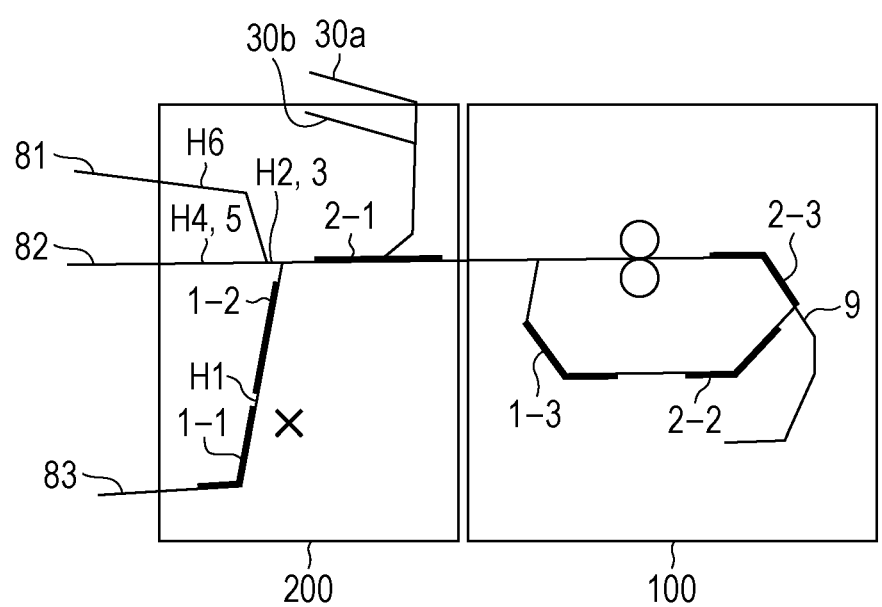
Figure 10A:
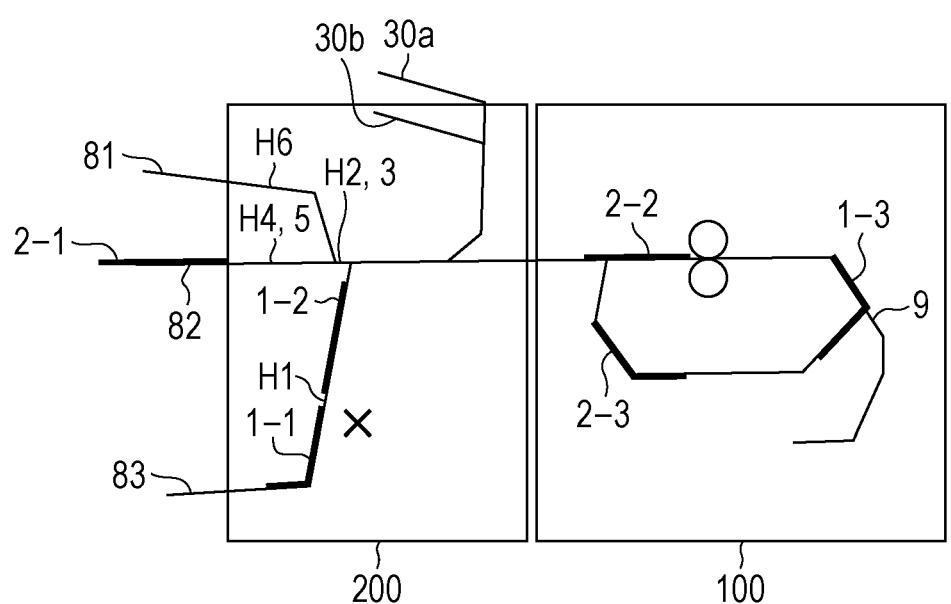

Under the condition of FIGS. 8A to 8D, a case where the sheet of 2-1 is set as the sheet to be determined at S6, will be described. It is determined that the sheet of 2-1 is a sheet in the subsequent sheet group, at S7, and a second surface of the sheet of 2-1 has no image formation performed at S8, and thus the image formation is performed (S9). At S10, it is determined that both surfaces have the image formation performed and it is determined that the ejection preparation has been completed since the sheet of 2-1 is the first sheet for the second sheet group. FIGS. 9A to 9C illustrate the condition where it is determined that the ejection preparation has been completed. In FIGS. 9A to 9C, the jammed sheet is present on the conveying path H1. Therefore, at S11, the determiner 306 determines that the ejection destination is required to be changed, and the controller 304 changes the ejection destination and ejects the sheet of 2-1, at S12. Here, the sheet of 2-1 is defined to be ejected to the ascent/descent ejected-paper tray 82. FIGS. 10A to 10C illustrate the condition where the sheet of 2-1 has been ejected to the ascent/descent ejected-paper tray 82.

As illustrated in FIGS. 9A to 9C, the sheet of 2-1 is conveyed to the post-processing apparatus 200, so that the number of sheets present in the image forming apparatus 100 is two. Therefore, YES is determined at S21, and the controller 304 feeds the sheet of 2-3 newly at S22.

Figure 11A:
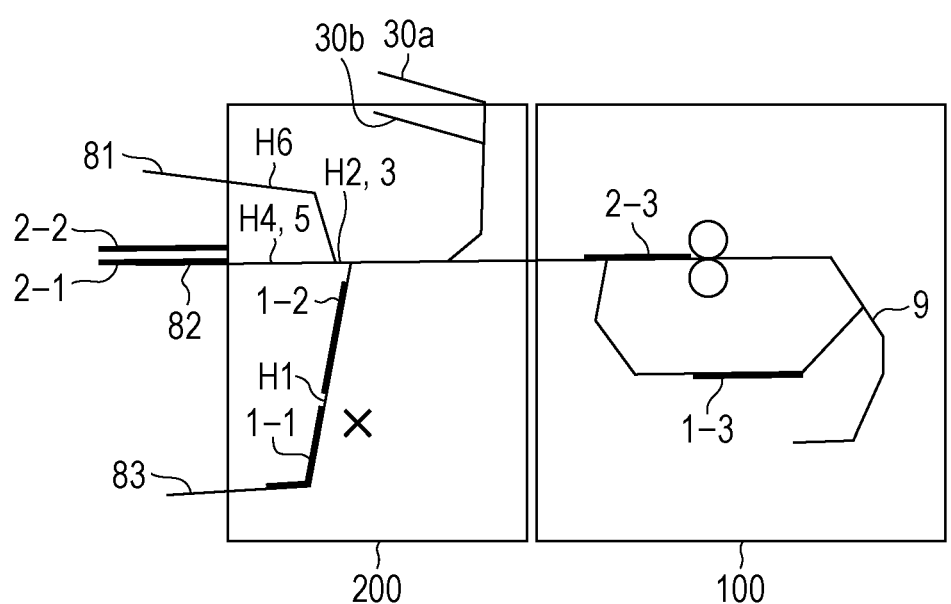

Next, a case where the sheet of 2-2 is set again as the sheet to be determined, will be described. It is determined that the sheet of 2-2 is a sheet in the subsequent sheet group, at S7, and it is determined that a second surface of the sheet of 2-2 has no image formation performed, at S8 (NO at S8). At S9, the controller 304 performs the image formation to the second surface of the sheet of 2-2. Since both surfaces have the image formation performed and the sheet of 2-1 just before the sheet of 2-2, has already been ejected, it is determined that the ejection preparation has been completed, at S10. Similarly to the sheet of 2-1, the determination of the ejection destination allows the sheet of 2-2 to be ejected to the ascent/descent ejected-paper tray 82. FIGS. 11A to 11C illustrate the condition where the sheet of 2-2 has been ejected to the ascent/descent ejected-paper tray 82. Note that, as illustrated in FIGS. 10A to 10C and FIGS. 11A to 11C, the sheet of 1-3 stays in the image forming apparatus 100.

Next, a case where the sheet of 2-3 is set again as the sheet to be determined, will be described. It is determined that the sheet of 2-3 is a sheet in the subsequent sheet group, at S7, and a second surface of the sheet of 2-3 has no image formation performed at S8, and thus the controller 304 performs the image formation to the second surface (S9). Since both surfaces have the image formation performed and the sheet of 2-2 just before the sheet of 2-3, has already ejected, it is determined that the ejection preparation has been completed, at S10. Similarly to the sheet of 2-1, the determination of the ejection destination allows the sheet of 2-3 to be ejected to the ascent/descent ejected-paper tray 82.

Since all the sheets in the subsequent sheet group (for the second copy) have been ejected at S23, the processing in the occurrence of the jam finishes. As described above, even when the sheet of 1-1 is the jammed sheet, the image forming processing can be completed to the second sheet group.

Figure 12:
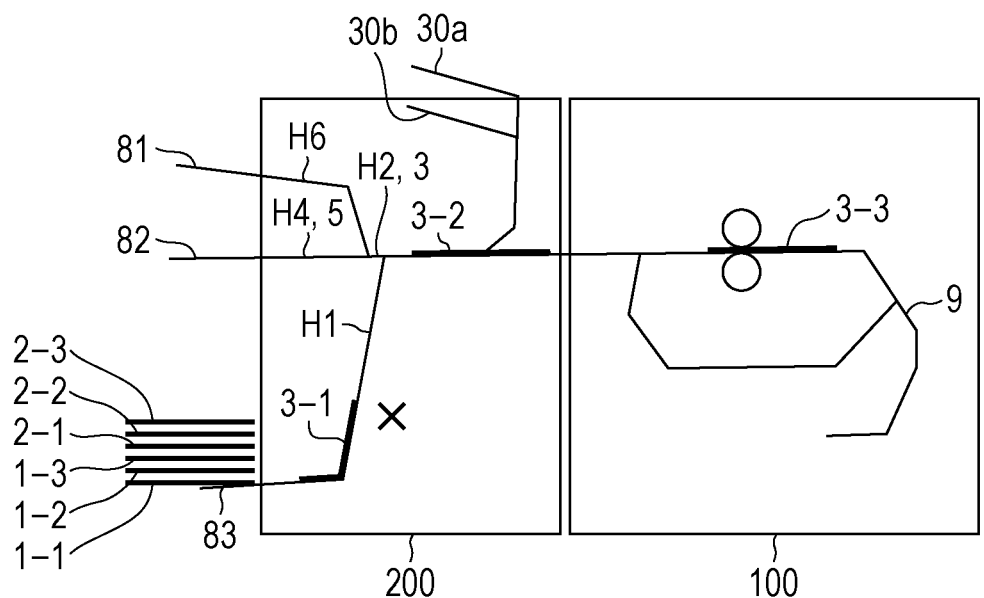
FIG. 12 is a diagram for describing control when the jam occurs.

FIG. 12 illustrates a different condition. FIG. 12 illustrates a case where the jam occurs in the last copy (the third copy). In this case, at S2, it is determined that no copy for which a sheet has already been fed, is present behind the jammed sheet. Therefore, after the processing at S25 finishes, the processing in the occurrence of the jam finishes.

Figure 13:
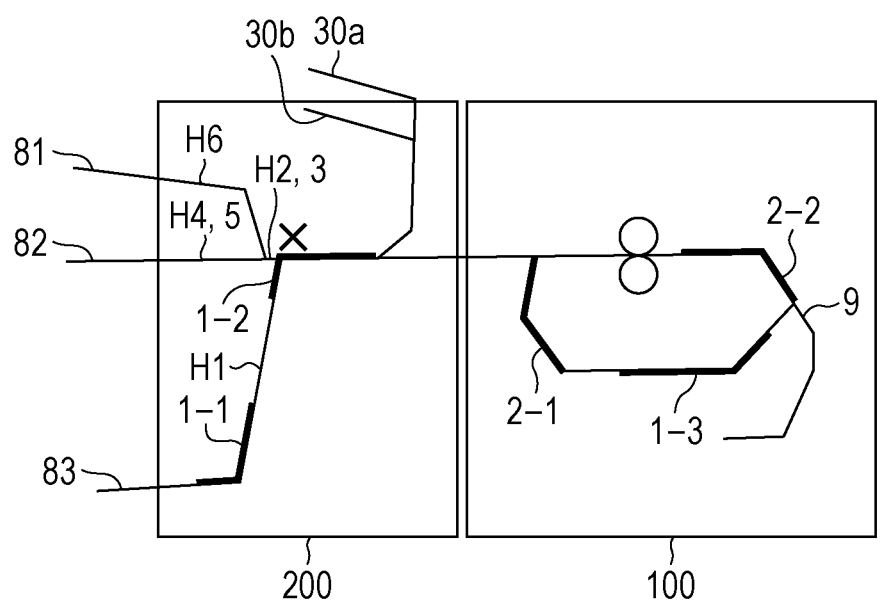
FIG. 13 is a diagram for describing control when the jam occurs.

FIG. 13 illustrates another different condition. FIG. 13 illustrates a case where the jam occurs at a position where the ejection destination cannot be changed. In this case, it is determined that no ejecting path can be ensured, at S4. Therefore, after the processing at S25 finishes, the processing in the occurrence of the jam finishes.

Figure 14:
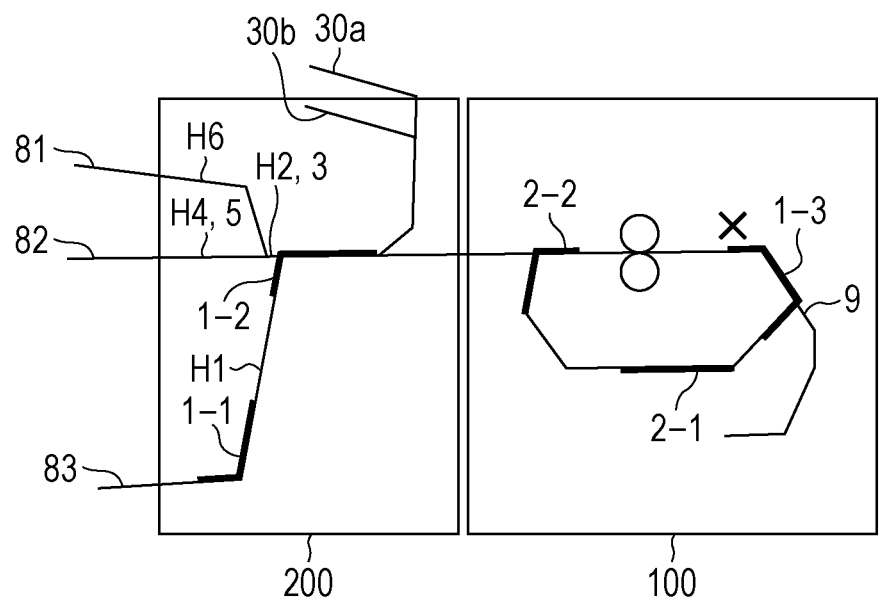
FIG. 14 is a diagram for describing control when the jam occurs.

FIG. 14 illustrates another different condition. FIG. 14 illustrates a case where the jam occurs at a position where the non-subsequent sheets cannot be returned to the reverse path. In this case, it is determined that the non-subsequent sheets cannot be evacuated without the subsequent sheet group ejecting path, at S17. Therefore, after the processing at S25 finishes, the processing in the occurrence of the jam finishes.

Figure 15:
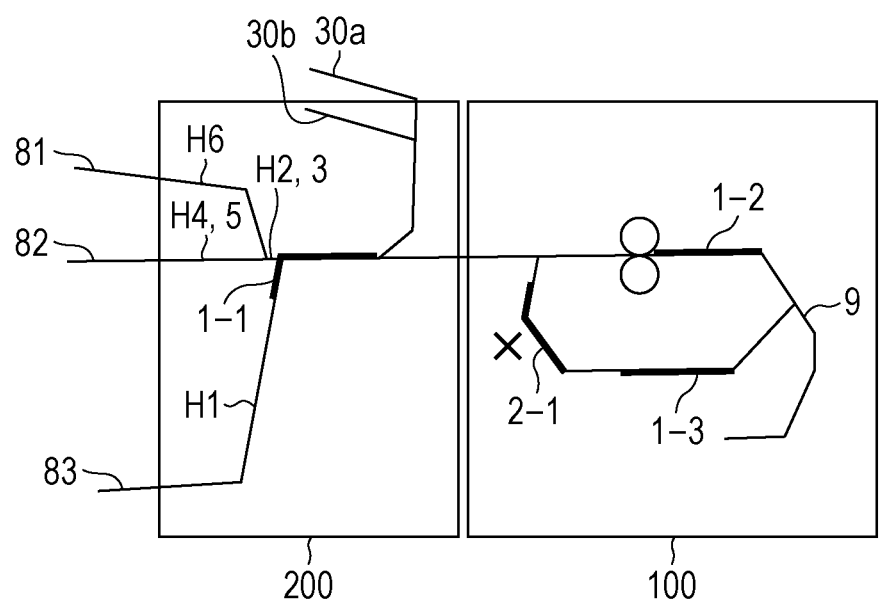
FIG. 15 is a diagram for describing control when the jam occurs.

FIG. 15 illustrates another different condition. FIG. 15 illustrates a case where the sheet of 2-1 is the jammed sheet on the reverse path. The jammed sheet is a sheet in the second sheet group. FIG. 15 illustrates that the printing is ready to be performed to a second surface of the sheet of 1-2 and a second surface of the sheet of 1-3 in the printing sequence as illustrated in FIG. 6. In this case, the sheet of 1-1 is to be ejected to the lower ejected-paper tray 83 being the predetermined ejection destination. In the determination of whether the ejection destination is required to be changed, at S11, it is determined that the change is not required (NO at S11). Therefore, the sheet of 1-2 and the sheet of 1-3 are also ejected to the lower ejected-paper tray 83, similarly to the sheet of 1-1. The ejection and evacuation of the other sheets are performed with determination similar to the above, and thus the descriptions thereof will be omitted.

Effects According to Present Embodiment

Figures 16B, 16C:
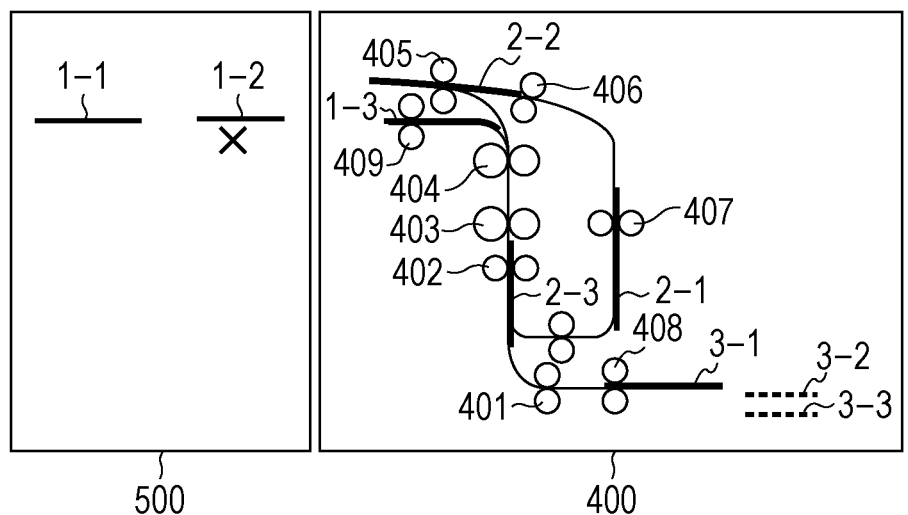

FIGS. 16A to 16C are diagrams and a table for describing a conventional image forming apparatus. FIG. 16A is a diagram for describing each sheet, and FIG. 16B simply illustrates a conventional image forming apparatus 400 and a post-processing apparatus 500. FIG. 16C illustrates a printing sequence. As a premise of FIGS. 16A to 16C, a job input by a user is defined for performing three-copies double-sided copying of one set of three sheets.

As illustrated in FIG. 16B, a conveying path for one sheet leads through a paper feeding roller 401, a timing roller 402, a secondary transfer roller 403, and a fusing roller 404 in sequence, in double-sided printing processing. Conveying the sheet through the conveying path, allows image formation to be performed to a first surface of the sheet. After that, in order to perform the image formation to a second surface of the sheet, the image forming apparatus 400 conveys the sheet through the timing roller 402, the fusing roller 404, and an ejecting roller 409 in this sequence after passing the sheet through a reverse roller 405, an ADU conveying roller 406, an ADU conveying roller 407, and a re-paper-feeding roller 408 in a double-sided path, so that the sheet is conveyed to the post-processing apparatus 500.

FIG. 16B illustrates that the sheet of 1-2 is a jammed sheet in the post-processing apparatus 500. In the example of FIG. 16B, the sheet of 1-3 having the double-sided image formation already completed, is present in the vicinity of the ejecting roller 409 upstream from the sheet of 1-2. In the example of FIG. 16B, the sheet of 2-1 and the sheet of 2-2, a first surface of each sheet having the image formation completed, are present in the image forming apparatus 400. In the example of FIG. 16B, the sheet of 2-3 and the sheet of 3-1 each have no image formation completed, but have already been fed.

The conventional image forming apparatus 400 performs an ejecting operation with pre-purging for the sheets of 2-1, 2-2, 2-3, and 3-1 in the sheet groups on the upstream side of the sheet group in which the sheet of 1-2 being the jammed sheet belongs. For example, the image forming apparatus 400 ejects the sheets outward through the reverse roller 405. The ejecting sequence is made such that the sheets are easily ejected. In the example of FIG. 16B, the ejection is performed, for example, in the sequence of the sheet of 2-3, the sheet of 2-1, the sheet of 3-1, and the sheet of 2-2. This arrangement causes the second copy and the third copy to be ejected outward as incomplete copies. That is, the sheet groups mixed together for the sheet sequence and the number of surfaces having the image formation already completed, are ejected outward. In this manner, the main focus of the conventional image forming apparatus 400 is to eject the sheets present in the image forming apparatus 400, and thus an incomplete sheet batch is ejected outward. Thus, the user itself needs to check whether the sheet batch that has been ejected (a sheet batch ejected in the occurrence of the jam) is based on the intention of the user. Therefore, the user is burdened.

Figure 17:
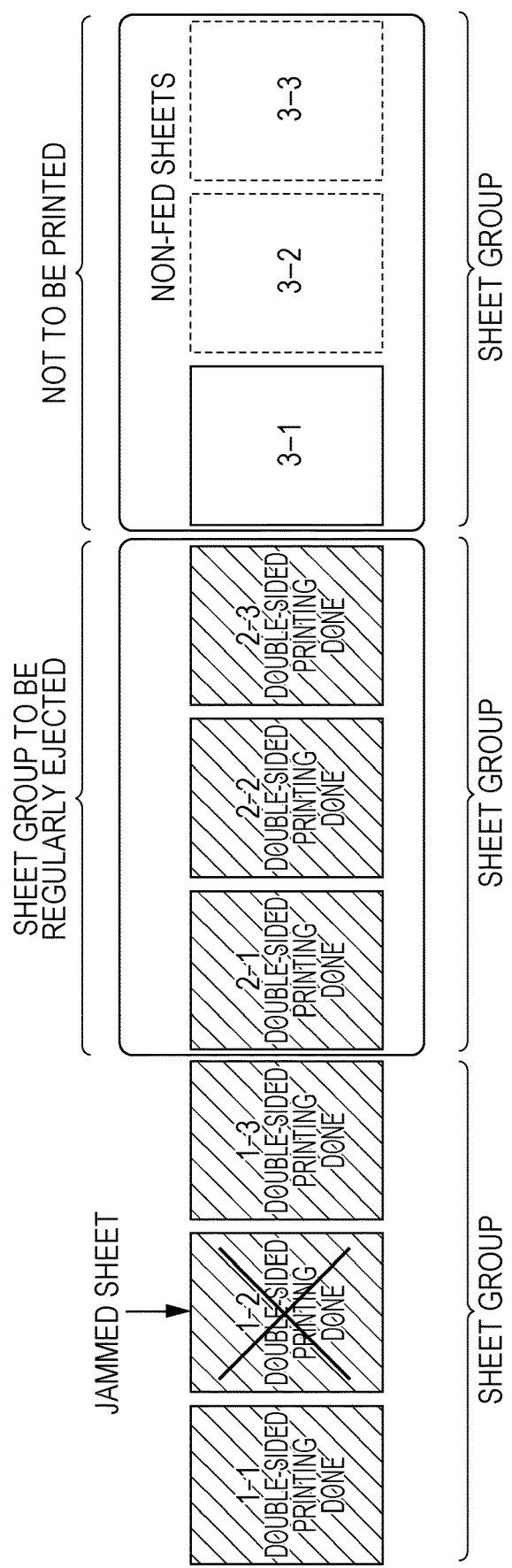
FIG. 17 is a diagram for describing control according to the present embodiment.

In contrast to this, according to the present specification, as illustrated in FIG. 17, the printing processing is completed to each of the plurality of sheets (three) included in a sheet group not including the jammed sheet even when the jam occurs (according to the present embodiment, the second sheet group), so that the sheets each having the printing processing completed, are ejected. Therefore, according to the present embodiment, sheets intended by the user can be ejected even when the jam occurs. Thus, the user can be prevented from being conventionally burdened. From a different viewpoint, the image forming system 1 according to the present embodiment, sorts an incomplete copy having a sheet already fed at the point in time when the jam occurs, to be a regular copy (batch) and then ejects the copy.

For example, the user may manually perform stapling processing (Hotchkiss processing) to the plurality of sheets that has been ejected. In this case, it is required to check whether the sheet batch that has been ejected is based on the intention of the user. According to the present embodiment, the sheets intended by the user can be ejected, so that the user does not need the check. Therefore, the burden of the user can be reduced.

The determiner 306 determines, as an image formation determiner, whether a sheet included in the sheet group not including the jammed sheet (e.g., a sheet group including the sheets in the subsequent sheet group), has the image forming processing completed (refer to S8). The controller 304 performs the image forming processing when it is determined that the image forming processing has not been completed (S9). Therefore, even when the sheet having no image formation completed, is present in the sheet group, the sheet group can be completed as a sheet group having the image formation already completed.

The controller 304 feeds, as a paper feeder, a sheet from the sheets housed in the paper cassette 5, to the image former 4. The determiner 306 determines whether at least one sheet has already been fed by the paper feeder, from the plurality of sheets included in the sheet group not including the jammed sheet (e.g., the sheet group including the sheets in the subsequent sheet group) (refer to S2). With the determination, when it is determined that the at least one sheet has already been fed (YES at S2) and when a sheet has not been fed (All YES at S19 to S21), the controller 304 continues to feed the sheet that has not been fed. Therefore, the missing sheet (the sheet that has not been fed) can be supplied even when the at least one sheet has already been fed and the sheet has not been fed in the sheet group not including the jammed sheet. Thus, the printing processing can be completed to the sheets included in the sheet group.

The controller 304 can eject, as an ejecting controller, a sheet to an ejector (an ejection destination). The ejecting controller can eject the sheet without the ejecting path for the sheet group not including the jammed sheet (refer to S15 and S16). That is, "the ejection destination for the sheet group not including the jammed sheet but having the printing processing completed" and "the ejection destination for the sheet group including the jammed sheet and having no printing processing completed" can be made different from each other. Therefore, the user can be prevented from mistaking "the sheet group not including the jammed sheet but having the printing processing completed" for "the sheet group including the jammed sheet and having no printing processing completed". The controller 304 may notify the user that "the ejection destination for the sheet group not including the jammed sheet but having the printing processing completed" and "the ejection destination for the sheet group including the jammed sheet and having no printing processing completed" are to be made in disagreement. For example, the controller 304 may display information regarding the effect that the ejection destinations of the two are different from each other, onto the display 1051. This arrangement can further prevent the user from mistaking "the sheet group not including the jammed sheet but having the printing processing completed" for "the sheet group including the jammed sheet and having no printing processing completed".

As described at S15' and S16', a sheet in the sheet group to which the jammed sheet belongs (e.g., the sheet of 1-2) is not necessarily ejected, the sheet staying at a region except the subsequent sheet group ejecting path. This configuration can prevent the sheet group to which the jammed sheet belongs, from being ejected. Therefore, the user can be prevented from mistaking "the sheet group not including the jammed sheet but having the printing processing completed" for "the sheet group including the jammed sheet and having no printing processing completed".

When NO is determined at S15, the controller 304 evacuates the sheets except the jammed sheet, included in the sheet group including the jammed sheet, to the reverse path. That is, when the ejecting destination for "the sheet group not including the jammed sheet but having the printing processing completed", cannot be ensured as an ejecting destination for "the sheet group including the jammed sheet and having no printing processing completed", the controller 304 evacuates "the sheet group including the jammed sheet and having no printing processing completed" to the reverse path, so that "the sheet group including the jammed sheet and having no printing processing completed" can be prevented from being ejected. Therefore, the user can be further prevented from mistaking "the sheet group not including the jammed sheet but having the printing processing completed" for "the sheet group including the jammed sheet and having no printing processing completed".

Modifications

The present embodiment has been described above with the drawings, but the present invention is not limited to the embodiment. The present invention is not limited to the embodiment, and thus various modifications and applications may be made.

(1) According to the present embodiment, the description in which the controller 304 does not eject the sheets in the sheet group including the jammed sheet (the non-subsequent sheet group) when NO is determined at S15, has been given. However, the determination at S15 may be omitted. For this configuration, the controller 304 may eject the sheets in the sheet group including the jammed sheet, to the subsequent sheet group ejecting path. That is, the subsequent sheet group ejecting path and the ejecting path for the sheet group including the jammed paper are identical to each other. In this case, for example, the controller 304 favorably performs confusion prevention control of preventing "the sheet group not including the jammed sheet but having the printing processing completed" and "the sheet group including the jammed sheet and having no printing processing completed" from being confused. The confusion prevention control includes, for example, control of ejecting "the sheet group including the jammed sheet and having no printing processing completed" after ejection of "the sheet group not including the jammed sheet but having the printing processing completed". The confusion prevention control further includes control of notifying the user that the control of ejecting "the sheet group including the jammed sheet and having no printing processing completed" after the ejection of "the sheet group not including the jammed sheet but having the printing processing completed", has been performed. The confusion prevention control includes, for example, control of displaying information regarding the effect that ""the sheet group including the jammed sheet and having no printing processing completed" is to be ejected after the ejection of "the sheet group not including the jammed sheet but having the printing processing completed"", onto the display 1051.

(2) The description in which the image forming system 1 according to the present embodiment performs specific processing in order to eject the sheet groups in accordance with the printing sequence and the number of sheets to be printed based on the job input by the user, has been given (refer to S2, S11 to S13, and S19 to S22). Here, the specific processing includes at least one of pieces of processing such as ejection destination switching processing, paper feeding continuing processing, and image forming processing. However, the determiner 306 may perform, as a paper feeding determiner, determination processing of determining whether the specific processing is to be performed, on the basis of a predetermined factor. With the determination, the image forming system 1 performs the specific processing when it is determined that the specific processing is to be performed, and does not perform the specific processing when it is determined that the specific processing is not to be performed.

Note that, the processing to be performed to a sheet includes paper feeding processing of the sheet to the image former 4, image forming processing in the image former 4, and ejecting processing of the sheet having the image formation completed, in this sequence. Therefore, for example, the specific processing may be the "paper feeding processing of the sheet to the image former 4" to be first performed. In this case, in other words for the determination processing, when at least one sheet has already been fed and a sheet has not been fed from the plurality of sheets included in the sheet group not including the jammed sheet, the determiner 306 may determine whether the sheet that has not been fed is to be fed, on the basis of a predetermined factor.

(2-1) Here, an exemplary predetermined factor will be described. The post-processing apparatus 200 performs various types of post-processing to a sheet having the image forming processing completed. The predetermined factor includes factors based on the various types of post-processing. The post-processing includes large burden processing being a large burden to performance of the user itself and small burden processing being a small burden to performance of the user itself. The large burden processing is, for example, binding processing. The small burden processing is, for example, the stapling processing.

First, a case where the post-processing set by the user is the binding processing as the large burden processing, will be described. If the user manually performs the binding processing, the burden of the user is large. Therefore, the post-processing apparatus 200 favorably performs the binding processing as the post-processing. It can be thought that the image forming system has a configuration of ejecting the sheet group not including the jammed sheet (a sheet group having no binding processing performed) if the jam occurs in the binding processing being the post-processing set by the user. This arrangement causes the user to manually perform the binding processing, so that the user is burdened. Furthermore, if the user itself does not perform the binding processing manually, the ejected sheets are discarded. As a result, the ejected sheets and the toner used in the printing processing to the ejected sheets, waste, and thus the cost increases. A time required for the printing processing wastes.

Therefore, when the user sets the processing being the large burden to the performance of the user itself (e.g., the binding processing), the image forming system according to the present modification does not perform the specific processing. In this case, for example, the user is notified of the occurrence of the jam and then the user removes the jammed sheet. After that, the image forming system performs the printing processing accompanied with the binding processing, again. Therefore, the increase in the cost can be reduced without burdening the user, and additionally the time required for the printing processing can be reduced.

Next, a case where the post-processing set by the user is the stapling processing as the small burden processing, will be described. Even when the user manually performs the stapling processing, the burden of the user is small. When the jam occurs in the stapling processing being the post-processing set by the user, the sheet group not including the jammed sheet is ejected (a sheet group having no stapling processing performed). Even when the sheet group is ejected, the user at least manually performs the stapling processing.

In this manner, the image forming system according to the present modification determines whether to perform the specific processing, in accordance with the post-processing set by the user. Therefore, the image forming system according to the present modification can appropriately eject the sheets.

(2-2) An exemplary different predetermined factor will be described. The touch screen 105 as an input part is capable of receiving various inputs from the user. The predetermined factor includes factors based on the inputs from the user. For example, when the user inputs the effect that the specific processing is not allowed to be performed, the image forming system according to the present modification does not perform the specific processing. This configuration allows the user itself to determine whether to perform the specific processing, so that the convenience of the user can improve. In (2-1) according to the present modification, the description in which the image forming system does not perform the specific processing when the post-processing is the large burden processing, and the image forming system performs the specific processing when the post-processing is the small burden processing, has been given. However, the image forming system may determine the post-processing of performing the specific processing or the post-processing of not performing the specific processing, on the basis of the input of the user. This configuration allows the convenience of the user to improve. For example, when the user desires printing of a sheet group in agreement with the printing sequence and the number of sheets to be printed intended by the user, ejection of the sheet group having the printing already completed, can be performed.

(3) The determiner 306 may determine, as a jammed sheet removing determiner, whether the jammed sheet can be removed. Furthermore, when it is determined that the jammed sheet can be removed, the controller 304 may issue, as a promotion notifier, a promotion notification for promoting the removal of the jammed sheet. For example, the image forming system may adopt a configuration having a door capable of opening and closing only the conveying path H1. When no influence is exerted on an ejecting operation to the ascent/descent ejected-paper tray 82 even with the jam occurring on the conveying path H1 and the door remaining open, in the image forming system adopting the configuration, the promotion notification may be issued to the user. This configuration allows, for example, the user to remove the jammed sheet appropriately.

(4) The image forming system may perform, instead of feeding a new sheet, control of regarding a sheet not being the jammed sheet, in the sheet group including the jammed sheet, the sheet having no printing performed, as the new sheet (hereinafter, referred to as alternative control).

For example, the description in which the sheet of 2-3 is fed when the sheet of 1-3, the sheet of 2-1, and the sheet of 2-2 coexist with each other in the image forming apparatus 100 as illustrated in FIGS. 7A to 9C, has been given above. However, the embodiment is not limited to the mode. For example, the controller 304 may perform, instead of feeding the sheet of 2-3, control of regarding the sheet of 1-3 (a sheet not being the jammed sheet, the sheet having no printing performed, in the sheet group including the jammed sheet) as the sheet of 2-3. This configuration can inhibit the sheets from wasting.

Meanwhile, the performance of the control of regarding the sheet 1-3 as the sheet of 2-3 causes the sheet of 1-3 to circulate a plurality of times on the conveying path in the image forming apparatus 100. This arrangement may cause the sheet of 1-3 to stain. Thus, the image forming system may determine whether to perform the alternative control, in response to a mode. For example, the image forming system feeds a new sheet, instead of performing the alternative control, when the mode selected by the user is any of a high-resolution mode, a high coverage mode, and a photographic image mode in which a photographic image is printed. Meanwhile, the image forming system performs the alternative control when the mode selected by the user is any of a low-resolution mode, a low coverage mode, and a text image mode in which a text image is printed. This configuration allows the alternative control to be performed flexibly.

(5) The description in which the image forming system 1 according to the present embodiment completes, even when the jam occurs, the printing processing to each of the plurality of sheets included in the sheet group not including the jammed sheet and ejects the sheets having the printing processing completed, has been given. However, the image forming system according to the present modification does not necessarily eject the sheets having the printing processing completed. In this case, the image forming system according to the present modification houses the sheets having the printing processing completed, into an acquisition-allowable region. The acquisition-allowable region allows the user to manually acquire the completed sheets. For example, an openable and closable door is provided in the image forming system, and opening the door allows the user to acquire the sheets housed in the acquisition-allowable region.

(6) According to the present embodiment, as described in FIG. 17, the description in which no printing processing is performed to the third sheet group, has been given. However, the printing processing may be performed to the third sheet group. That is, the printing processing may be performed to all the sheet groups except the sheet group including the jam occurring. This configuration allows the printing processing as close to the job input by the user as possible, to be performed. Therefore, the convenience of the user can improve.

The image forming system according to the present modification houses the sheets having the printing processing completed, into the acquisition-allowable region. In addition, the image forming system according to the present modification notifies the user of the effect that the printing processing has been completed. With this configuration, the processing of searching an ejecting path and an ejection destination for the sheets, is not necessarily performed (S3 and S4 of FIG. 5). Therefore, the burden of the processing can be reduced.

(7) According to the present embodiment, the reverse path has been exemplified as an evacuation region (e.g., refer to S17 of FIG. 5). However, the evacuation region for the sheets is not limited to the reverse path, and thus may be a different region. The evacuation region may be a region in the post-processing apparatus 200 or a region in the image forming apparatus 100. This configuration also achieves an effect similar to that according to the present embodiment.

[Others]

An essential element of the present invention includes software stored in a flash memory or a different storage medium, or software downloadable through a network. Note that, in addition to a DVD-ROM, a CD-ROM, a FD, or a hard disk, the recording medium may be a medium that retains a program in a fixing manner, such as a magnetic tape, a cassette tape, an optical disc, an optical memory card, or a semiconductor memory, such as a mask ROM, an EPROM, an EEPROM, or a flash ROM. The recording medium includes a non-transitory medium allowing a computer to read the program or the like. The program mentioned here includes a program in a source program format, a compressed program, and an encrypted program, in addition to a program that can be directly executed by a CPU.

Although embodiments of the present invention have been described and illustrated in detail, the disclosed embodiments are made for purposes of illustration and example only and not limitation. The scope of the present invention should be interpreted by terms of the appended claims. The scope of the present invention is intended including all alterations in the spirit and scope equivalent to the scope of the claims. The invention described in the embodiment and each of the modifications is intended to be carried out in isolation or in combination as far as possible.

What is claimed is:

1. An image forming apparatus comprising:
   an image former that performs image forming processing to a plurality of sheets included in each of a plurality of sheet groups; and
   a detector that detects occurrence of a jam,
   a determiner that determines, when at least one sheet has been fed and a missing sheet has not been fed from the plurality of sheets included in a sheet group not including a jammed sheet, whether the missing sheet that has not been fed is to be fed, based on a predetermined factor, and
   wherein the image former completes the image forming processing to each of the plurality of sheets included in the sheet group not including the jammed sheet that has generated the jam.

2. The image forming apparatus according to claim 1, wherein the determiner determines whether the image forming processing has been completed to the sheets included in the sheet group not including the jammed sheet, and
   wherein the image former performs the image forming processing to a sheet determined having the image forming processing not completed, by the determiner.

3. The image forming apparatus according to claim 1, further comprising:
   a container that houses the sheets; and
   a paper feeder that feeds the sheets housed in the container to the image former,
   wherein the paper feeder feeds, when at least the one sheet has been fed and the missing sheet has not been fed from the plurality of sheets included in the sheet group not including the jammed sheet, the missing sheet that has not been fed.

4. The image forming apparatus according to claim 1, further comprising:
   a container that houses the sheets; and
   a paper feeder that feeds the sheets housed in the container to the image former.

5. The image forming apparatus according to claim 1, further comprising:
   a post-processing performer that performs post-processing to the sheets having the image forming processing completed, wherein the predetermined factor includes a factor based on a type of the post-processing.

6. The image forming apparatus according to claim 1, further comprising:
   a receiver that receives an input from a user, wherein the predetermined factor includes a factor based on the input from the user.

7. The image forming apparatus according to claim 1, further comprising:
   a paper ejector that ejects the sheets,
   wherein the paper ejector does not eject the plurality of sheets included in the sheet group including the jammed sheet.

8. The image forming apparatus according to claim 1, further comprising:
   an evacuator that evacuates the plurality of sheets included in the sheet group including the jammed sheet, into an evacuation region different from a path for the plurality of sheets included in the sheet group not including the jammed sheet.

9. The image forming apparatus according to claim 8, further comprising:
   a reverse path that allows the image former to complete the image forming processing to both sides of the sheets,
   wherein the evacuation region includes the reverse path.

10. The image forming apparatus according to claim 1, wherein the determiner further determines whether the jammed sheet is allowed to be removed; and
    the image forming apparatus further comprises a promotion notifier that issues, when it is determined that the jammed sheet is allowed to be removed, a promotion notification for promoting a removal of the jammed sheet.

11. The image forming apparatus according to claim 1, further comprising:
    a plurality of ejecting paths;
    a plurality of ejectors corresponding to the plurality of ejecting paths;
    a hardware processor that ejects the sheets to any of the plurality of ejectors; and
    the determiner further determines whether an ejecting path is allowed to be ensured for the plurality of sheets included in the sheet group not including the jammed sheet that has generated the jam,
    wherein the determiner further determines, when determining that the ejecting path is not allowed to be ensured, whether the ejecting path corresponding to a different ejector from the ejector corresponding to the ejecting path determined not allowed to be ensured, is allowed to be ensured, and
    the determiner ejects, when it is determined that the ejecting path corresponding to the different ejector is allowed to be ensured, the plurality of sheets having the image forming processing completed, to the ejecting path.

12. The image forming apparatus according to claim 1, wherein the predetermined factor includes a factor based on a type of post-processing.

13. An image forming method with an image forming apparatus that performs image forming processing to a plurality of sheets included in each of a plurality of sheet groups, the image forming method comprising:
- detecting occurrence of a jam;
- determining, when at least one sheet has been fed and a missing sheet has not been fed from the plurality of sheets included in a sheet group not including a jammed sheet, whether the missing sheet that has not been feed is to be fed, based on a predetermined factor; and
- completing the image forming processing to each of the plurality of sheets included in the sheet group not including the jammed sheet that has generated the jam.

14. The image forming method according to claim 13, wherein the predetermined factor includes a factor based on a type of post-processing.

15. A non-transitory recording medium storing a computer readable image forming program causing an image forming apparatus including an image former that performs image forming processing to a plurality of sheets included in each of a plurality of sheet groups to perform:
- detecting occurrence of a jam;
- determining, when at least one sheet has been fed and a missing sheet has not been fed from the plurality of sheets included in a sheet group not including a jammed sheet, whether the missing sheet that has not been feed is to be fed, based on a predetermined factor; and
- causing the image former to complete the image forming processing to each of the plurality of sheets included in the sheet group not including the jammed sheet that has generated the jam.

16. The non-transitory recording medium according to claim 15, wherein the predetermined factor includes a factor based on a type of post-processing.

* * * * *